Nov. 23, 1948.  J. W. MILLER  2,454,331
PLANER ATTACHMENT FOR LATHES
Filed Dec. 1, 1944  2 Sheets-Sheet 1
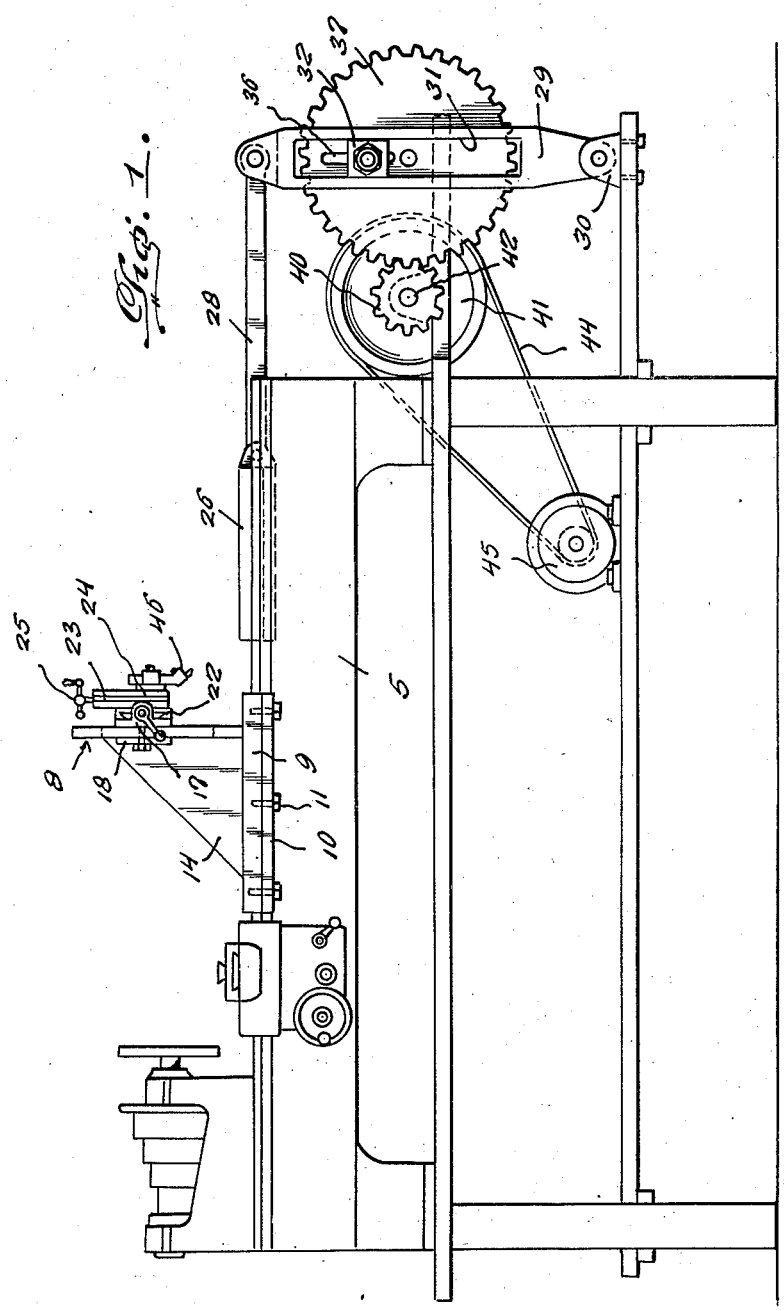
Inventor
Joe W. Miller,
By [signatures]
Attorneys Nov. 23, 1948. J. W. MILLER 2,454,331
PLANER ATTACHMENT FOR LATHES
Filed Dec. 1, 1944 2 Sheets-Sheet 2
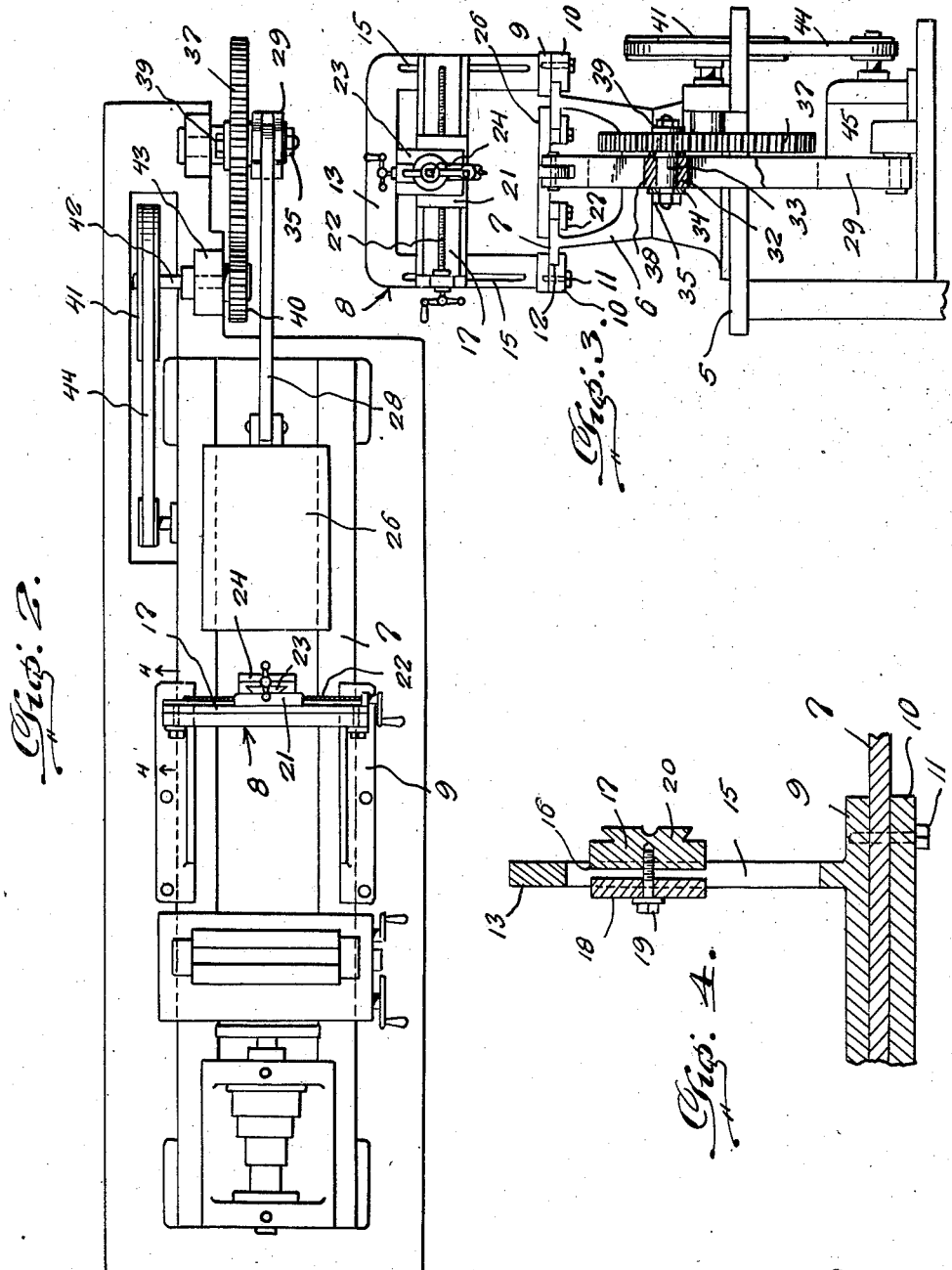
Inventor
Joe W. Miller, Patented Nov. 23, 1948

2,454,331

UNITED STATES PATENT OFFICE 2,454,331

PLANER ATTACHMENT FOR LATHES

Joe W. Miller, Brunswick, Ga.

Application December 1, 1944, Serial No. 566,189

2 Claims. (Cl. 90—37)

The present invention relates to new and useful improvements in lathes, and more particularly to a detachable planer attachment adapted for mounting in operative position on the lathe.

More specifically, the invention embodies the provision of a tool holder mounted in a stationary position on the ways of the lathe bed and adapted for vertical and horizontal adjustment thereon, together with a bed to which the work is adapted for attaching and reciprocably operated beneath the tool carried by the tool holder for machining the work.

An important object of the present invention is to provide novel means providing an operative connection between the bed on which the work is carried and a motor mounted on the lathe for reciprocably actuating the work bed.

A still further object is to provide a planer attachment of this character for lathes and in which the several parts forming the invention may be easily and quickly operatively mounted on a lathe of conventional construction without necessitating any changes or alterations in the construction thereof, and which may be removed therefrom, when desired, without interfering with the normal use of the lathe.

An additional object is to provide an attachment of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is an end elevational view with parts broken away and shown in section, and Figure 4 is a fragmentary sectional view through the tool carrier taken substantially on a line 4—4 of Figure 2.

Referring now to the drawings in detail, wherein for the purpose of illustration I have disclosed a preferred form of the invention, the numeral 5 designates a lathe of conventional construction and which includes the lathe bed 6 having spaced parallel, longitudinally extending ways 7 supported by the bed.

A tool carrier designated generally at 8 includes a pair of spaced parallel, longitudinally extending base members 9 slidably and adjustably mounted on the outer edge portions of the ways 7 and secured in position thereon by elongated plates 10 secured to the under side of the base members 9 by bolts 11, the plates 10 being rabbeted at their inner edges, as shown at 12, for receiving the outer edges of the ways 7 and by means of which the base members 9 are clamped in position on the ways in longitudinally adjusted position thereon.

An upstanding frame 13 rises from the base members 9, adjacent one end of the latter, the frame member being supported in an upright position by braces 14. The frame 13 is located astride or across the major portion of the ways 7 and also the space between said ways to provide ample space for the reciprocating work holding bed 26.

The sides of the fame 13 are formed with vertically extending slots 15 constituting vertical guides in which vertical ribs 16 on a transversely extending tool rail 17 are slidably received and secured in vertically adjusted position by means of a clamping block 18 secured to the rail 17 by means of bolts 19.

The front surface of the rail 17 is formed with a dovetailed rib 20 on which a block 21 is slidably mounted for adjustment transversely of the lathe by means of an adjusting screw 22.

The block 21 is formed with a dovetail vertically extending rib 23 on which a tool holder 24 is slidably mounted and adjusted vertically thereon by means of a screw 25.

A work-supporting bed 26 has its side edges slidably mounted on the inner edge portion of the ways 7 and retained in position thereon by guide strips 27 bolted to the under side of the bed. The work may be supported and secured on top of the bed 26 in any suitable manner.

A pitman arm 28 is pivotally attached at one end to the outer edge of the bed 26, the other end of the pitman arm being pivoted to the upper end of an arm 29 which is pivotally supported at its lower end on a part of the frame of the lathe 5 by means of a bracket 30. The arm 29 is formed with a longitudinally extending slot 31 in which a block 32 is slidably positioned. A pin 33 is journaled in the block and retained thereon by means of a washer 34 and nut 35 at one end of the pin, the other end of the pin projecting outwardly beyond the block 32 and slidably positioned in a radially extending slot 36 formed in a bull gear 37.

A flange 38 is formed on the pin 33 between the block 32 and the adjacent side of the gear 37 to prevent binding of the block with the gear and the gear is retained in position on the pin by a nut and washer 39 and by means of which the block 32 is secured in radially adjusted position with respect to the gear 37.

By reason of this adjustment of the block 32 laterally of the gear 37 and eccentric adjustment between the arm 29 and the gear is provided to thus vary the throw of the pitman arm 28.

The gear 37 is driven by means of a pinion 40 secured to a pulley 41 by means of a shaft 42 journalled in bearings 43 carried by a part of the frame of the lathe, the pulley 41 being driven by means of a belt 44 from an electric motor 45.

It is to be noted that the attachment comprises two cooperating units. The unit 8 comprising the tool carrier is adapted to be clamped directly to a conventional lathe structure 5 as indicated by the parts 9, 10 and 11. The other unit comprising the slidable work holder 26 including its operating mechanism and the electric motor 45 are also mounted on the lathe 5. The work holder 26 is slidably mounted between guide ways 7. One end of the work holder 26 is pivotally connected to one end of an operating pitman 28. The other end of the pitman 28 is connected pivotally with oscillating mechanism including a rotary electric motor 45 which directly actuates or propels a step-down or reducing transmission comprising the parts 40, 41 and 44. The motor 45 and the oscillating mechanism driven thereby are mounted on a horizontal lower support and on a horizontal intermediate support, the latter being located substantially midway between the lower support and the guide ways 7. The pinion 40 and the pulley 41 are mounted fixedly on a shaft 42. The shaft 42 and the shaft for gear 37 are supported in bearings located on the intermediate support.

The motor 45 and the bracket 30 are mounted in spaced relation from each other on the lower support.

The planer attachment constitutes equipment including the above designated units plus the intermediate and lower horizontal supports.

In the operation of the device, the work-supporting bed 26 will be reciprocably actuated so that the work may be moved toward and away from the tool 46 mounted on the tool carrier of this machine for planing the work.

It is believed the details of construction, operation and advantages of the device will be readily understood from the foregoing without further detailed explanation.

I claim:

1. A planer attachment for lathes comprising in combination a work-supporting bed slidably mounted on the lathe, a tool carrier, means for securing the carrier in longitudinally adjusted position on the lathe, said carrier having spaced parallel vertically extending slots, a horizontal tool rail, means for securing the ends of the rail in vertically adjusted position in said slots, a block slidably mounted on the rail for movement laterally of the lathe, a tool holder, and means connecting the tool holder to the block for vertical adjustment of the holder relative to the block.

2. A tool carrier for lathes of a type including spaced parallel longitudinally extending ways, said carrier including spaced parallel longitudinally extending base members slidably mounted on the ways, means for securing the base members in longitudinally adjusted position on the ways, a frame rising from the base members and having vertically extending slots in the sides of the frame, a horizontal tool rail having its ends adjustably secured in said slots, a block slidably carried by the rail for movement laterally of the lathe, and a tool holder carried by the block and adjustable vertically thereon.

JOE W. MILLER.

REFERENCES CITED

The following references are of record in the file of this patent:

UNITED STATES PATENTS

| Number | Name | Date |
|---|---|---|
| 477,200 | Crowell | June 21, 1892 |
| 890,544 | Whitcomb | June 9, 1908 |
| 1,023,268 | Murray | Apr. 16, 1912 |
| 1,198,727 | Kaddeland | Sept. 19, 1916 |
| 1,225,117 | Dunlap | May 8, 1917 |
| 1,537,059 | Bausch | May 12, 1925 |
| 2,123,788 | McNaughton | July 12, 1938 |